May 21, 1940. G. HUNT 2,201,339

CLUTCH DRIVEN PLATE

Filed Jan. 22, 1937

Inventor
George Hunt
By Blackmore, Spencer & Flint
Attorneys

Patented May 21, 1940

2,201,339

UNITED STATES PATENT OFFICE 2,201,339

CLUTCH DRIVEN PLATE

George Hunt, Dayton, Ohio, assignor to General Motors Corporation, Detroit, Mich., a corporation of Delaware Application January 22, 1937, Serial No. 121,728

7 Claims. (Cl. 192—107)

This invention relates to clutches and has been designed with the object of providing an improved clutch for use with the engine of a motor vehicle.

The major object of the invention is to provide an improved driven plate for such a clutch.

A further object is to provide such a driven plate which may be cheaply manufactured and yet be highly efficient in operation.

The invention also contemplates the provision of a novel process in the manufacture of such a driven plate and in the use of a novel machine for performing the several steps of the process.

Other objects and advantages will be understood from a reading of the following description.

Figure 1:
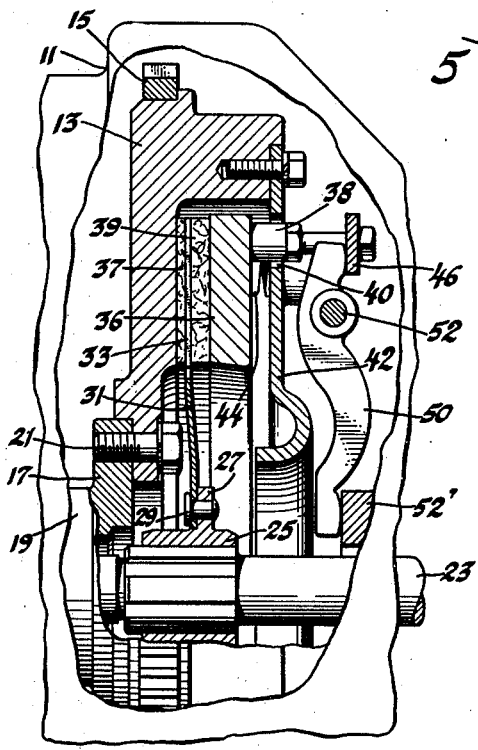
Fig. 1 shows in elevation a part of the clutch housing, its wall being broken away to show in section the principal parts of the novel clutch.
Figure 2:
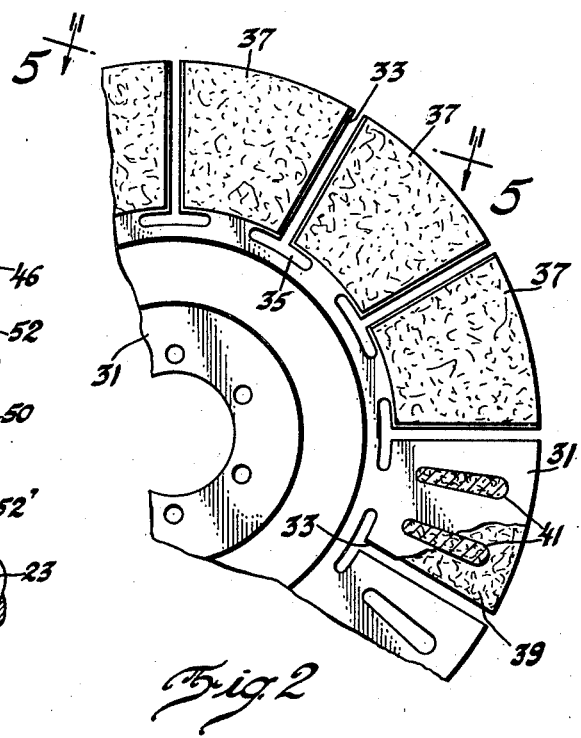
Fig. 2 shows in elevation the driven plate.
Figure 7:
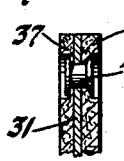
Fig. 7 is a partial sectional view of a modified form.

Referring by reference characters to the drawing, numeral 11 designates a housing which is to be connected to the engine block. Within the housing is shown a flywheel 13 carrying the usual gear ring 15 whereby the engine is started from a starting motor. The flywheel is connected to a flange 17 of the engine crank shaft 19 by fastening means 21. At 23 is the clutch driven shaft axially aligned with the engine shaft. Mounted non-rotatably on driven shaft 23 is a hub 25 having a flange 27. A plurality of rivets 29 or other fastening means is used to secure to this hub a flexible driven clutch plate 31. This clutch plate is provided with radial slots 33 extending inwardly from its periphery, these slots terminating in circumferential slots 35 as best shown in Fig. 2. Friction facings 37 and 39 are secured to opposite sides of the sections of the driven plate between the slots 33. As shown in the drawing, the slots between the sections 37, 37 and 39, 39 register with each other and are somewhat wider than the slots 33 formed in the plate. If, as may be preferred, the friction facings are molded to the plate, the plate may be formed with slots 41 to receive the friction material whereby the facings are held in locked position. If preferred, however, the friction facings may be secured by rivets 43 as is shown in a modified form in Fig. 7.

For driving the driven plate with the flywheel, there is employed a more or less conventional pressure plate 36. This pressure plate has an extension 38 extending through an opening 40 of a cover plate 42, the latter secured to the flywheel by fastening means. The pressure plate is normally thrust toward the flywheel by a spring 44 to grip the driven plate between the flywheel and itself and thereby drive the driven plate and shaft 23. Although forming no part of the invention, there is shown a bridge member 46 carried by the projection 38 of the pressure plate, which bridge member may be engaged by the end of a lever 50 pivoted at 52 to the cover plate 42. Slidable axially of the driven shaft 23 is a collar 52' engaging the inner end of the lever. When the collar 52' moves axially to the left it rotates the lever 50 and moves the pressure plate 36 against the compression of spring 44 and thereby releases the clutch.

Figures 3, 4:
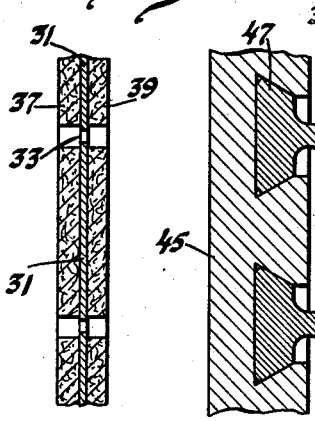
Fig. 3 is a section corresponding substantially to line 5—5 of Fig. 2 of the driven plate after the first step in the process of manufacture.
Fig. 4 shows a similar section of the driven plate assembled on a fixture for performing succeeding steps in the operation.

After securing the facings 37, 39 to the sections of the plate 31 between the slots 33, a section of the resulting assembly along the line 5—5 of Fig. 2 will be as shown by Fig. 3.

Figure 5:
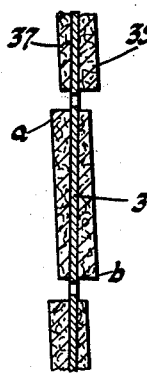
Fig. 5 shows a section of the completed clutch plate.
Figure 6:
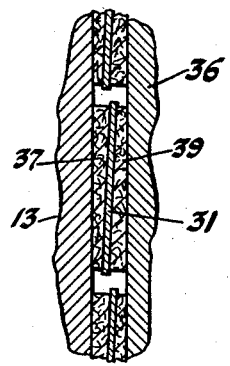
Fig. 6 shows the completed plate as compressed between the flywheel and pressure plate of the clutch.

It is common in driven plates to distort such parts as the sections between the slots 33, the distorted part being compressed into the plane of the plate when the clutch is engaged. I prefer, however, that the plate shall be normally flat, and that the facings shall at all times conform to the opposite faces of the plate. To secure the necessary smooth engagement of the clutch, I prefer to grind off the facings so that the surfaces of the opposite facings shall be parallel to each other but out of parallelism with the underlying sections of the driven plate. To that end I make use of a circular grinding table, of which the part marked 45 is a section. Mounted in this grinding table are supporting members 47, the table being provided with dovetail slotted formations to hold said supports. The extended ends 49 of said supports are substantially of the same dimension as the slots formed by the adjacent parts of the facings. The extended ends 49 are also provided with offset notches 51 and 53 to receive the adjacent walls of the slots of the metal plate. By this arrangement it will be seen that the plate sections between the slots are twisted or distorted in such a way that the surfaces of the facings are out of parallelism with the normal plane of the metal plate. In fact the surfaces may be described as of stepped formation as illustrated by the dot and dash lines of Fig. 4. A grinding operation is then performed upon the surfaces of the facings remote from the table 45 until a uniform plane surface is described by the several facings. This surface will obviously be substantially parallel with the undistorted portion of the plate. The full lines of Fig. 4 show the facing having this new formation. As a next step in the operation, the plate is removed from the fixture and reversed in position, whereby the facings 37 are brought into a position corresponding to the position of facings 39 shown in Fig. 4. The facings 37 are then ground down into parallelism to the undisturbed plane of the plate as before. Upon the removal of the driven plate a section according to section 5—5 of Fig. 2 is represented by Fig. 5, this figure showing the plate restored by its own resiliency to a plane surface. When such a plate is positioned between the flywheel surface of the clutch and the pressure plate, the flywheel and pressure plate first engage the projecting portions a and b. As the clutch elements approach each other, the surfaces of the driving elements engage more and more of the surfaces of the facings until the condition shown by Fig. 6 exists where full engagement occurs between the clutch facings on the one hand and the flywheel and pressure plate on the other. In this condition the section of the metal plate between the slots is twisted or distorted in much the same way as it was twisted in the fixture 45. Since the engagement is progressive from points a and b, the thicker ends of the facings toward the thinner ends, a gradual engagement is effected and grabbing of the clutch is avoided.

A clutch driven plate constructed as above is economical to manufacture, insures a smooth clutch engagement, and avoids the necessity of an original distortion of parts of the driven plate.

I claim:

1. In a driven clutch disc, a flexible plate having radial slots adjacent its periphery forming plate sections, facings on opposite sides of each section, each facing varying in thickness circumferentially, the remote surfaces of said facings being parallel to each other but angularly related to the plane of said section.

2. The invention defined by claim 1, the radial lines through said surfaces being parallel with the plane of said plate.

3. In a driven clutch disc, a flexible plate having radial slots extending from its periphery forming sections, facings on the opposite sides of each section, the thickness of each facing being progressively greater from one radial end to the other.

4. In a driven clutch disc, a flexible plate having radial slots extending from its periphery forming sections, facings on opposite sides of each section, the remote surfaces of said facings being parallel to each other but not parallel to the plane of said plate, the thickness of each facing being progressively greater from one radial end to the other.

5. In a driven clutch disc, a flexible plate having radial slots extending from its periphery forming sections, facings on opposite sides of each section, the remote surfaces of said facings being parallel to each other but not parallel to the plane of said plate, the thickness of each facing being progressively greater from one radial end to the other, the thick part of one facing located opposite the thin part of the other.

6. In a driven clutch disc, a flexible plate, having a plurality of radial slots forming sections, a frictional facing secured to each side of each section, the remote surfaces of the facings of each section being parallel to each other and angularly related to the plane of its section, the radii through said remote surfaces being parallel to the plane of said plate.

7. The invention defined by claim 5, said radial slots being between said pairs of facings, said slots being narrower than the spaces between said facings.

GEORGE HUNT.